(No Model.) 2 Sheets—Sheet 1.

F. A. RICH.
CHANGEABLE GEARING FOR BICYCLES.

No. 555,886. Patented Mar. 3, 1896.

Witnesses
John N. Holt
Maurice J. Biousse

Inventor
Francis A. Rich,
by Whitman & Wilkinson,
Attorneys

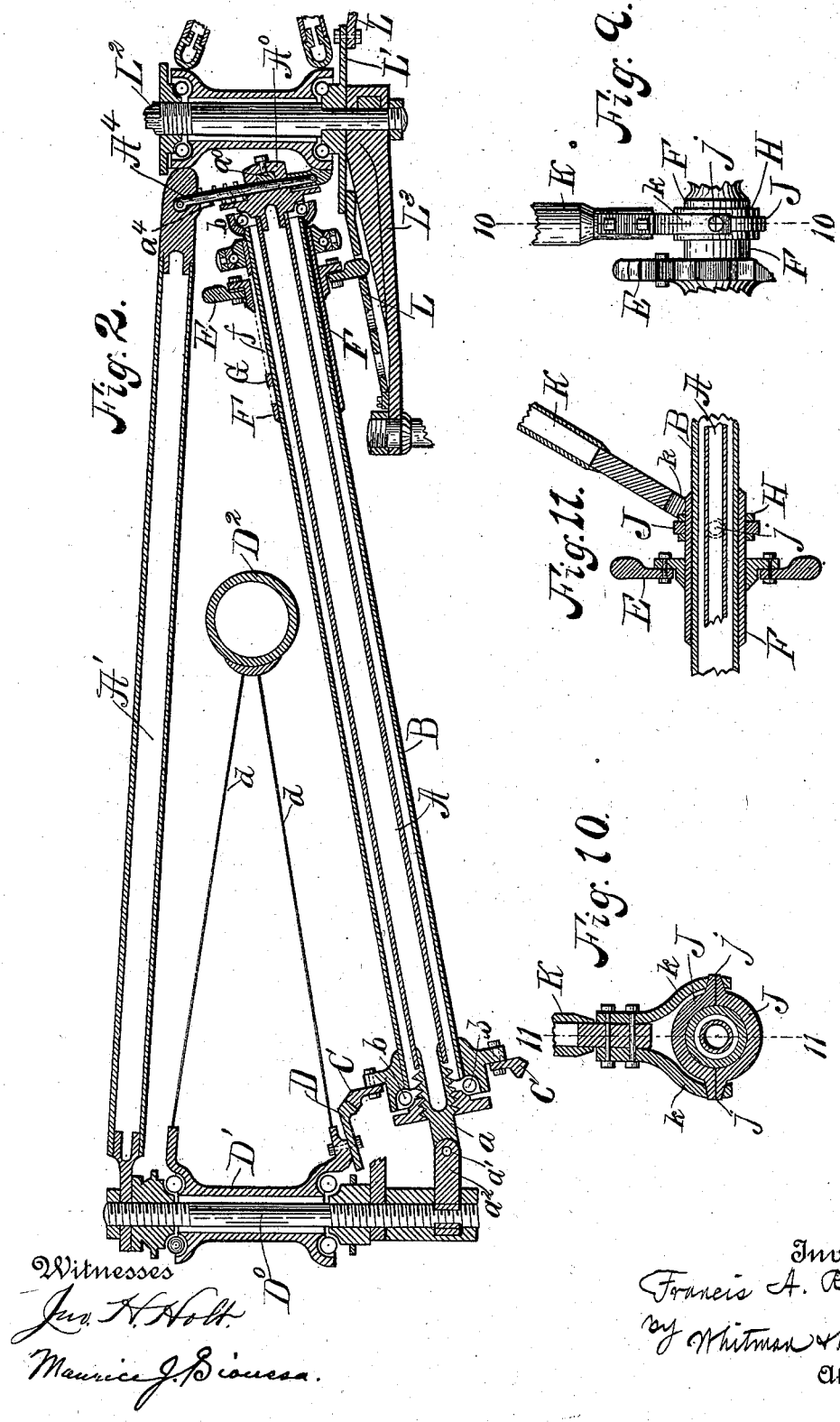

United States Patent Office.

FRANCIS A. RICH, OF DENVER, COLORADO.

CHANGEABLE GEARING FOR BICYCLES.

SPECIFICATION forming part of Letters Patent No. 555,886, dated March 3, 1896.

Application filed June 29, 1895. Serial No. 554,491. (No model.)

*To all whom it may concern:*

Be it known that I, FRANCIS A. RICH, a citizen of the United States, residing at Denver, in the county of Arapahoe and State of Colorado, have invented certain new and useful Improvements in Changeable Gearing for Bicycles; and I do hereby declare the following to be a full, clear, and exact description of the invention, such as will enable others skilled in the art to which it appertains to make and use the same.

My invention relates to improvements in changeable gearing for bicycles; and it consists of certain novel features hereinafter described and claimed.

Reference is had to the accompanying drawings, in which the same parts are indicated by the same letters throughout the several views.

Figure 1:
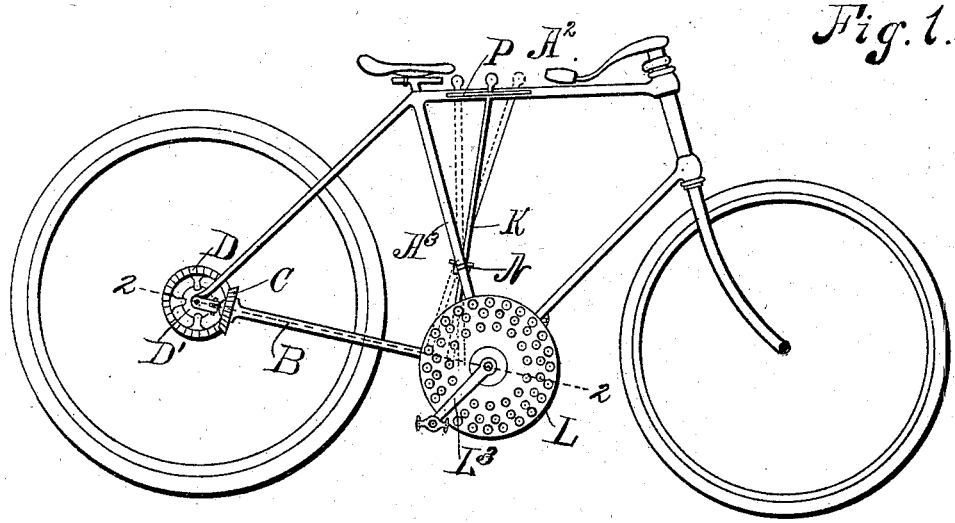
Figures 3, 4:
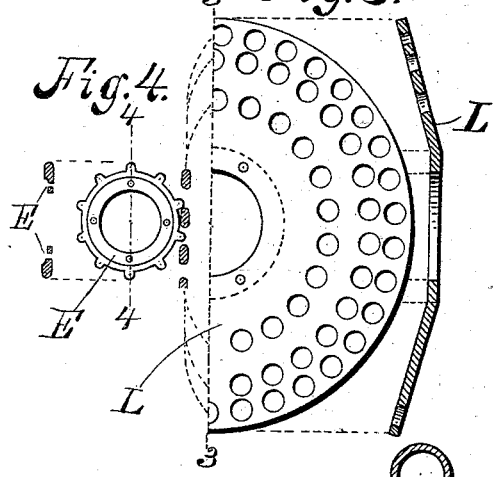
Figure 5:
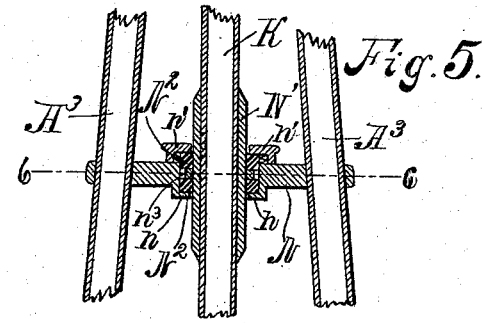
Figure 6:
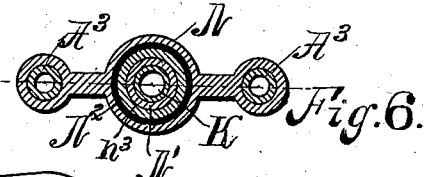
Figures 7, 8:
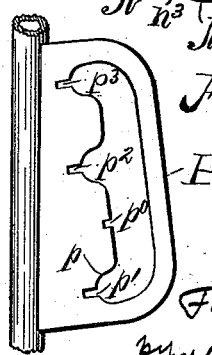

Figure 1 represents a side elevation of a bicycle constructed according to my invention. Fig. 2 represents a section along the line 2 2 of Fig. 1. Fig. 3 represents an enlarged detail view, in side elevation and in central section, of the perforated disk which is connected to the pedal-crank. Fig. 4 represents in side elevation and in central section the pinion for engaging in said perforated disk. Fig. 5 represents in central vertical section the manner of pivoting the changing-lever on the machine and is a section along the line 5 5 of Fig. 6. Fig. 6 represents a section along the line 6 6 of Fig. 5. Fig. 7 represents a central longitudinal section of the upper part of the changing-lever. Fig. 8 is a plan view of the plate attached to the cross-bar at the top of the bicycle-frame for holding the changing-lever at the desired position. Fig. 9 represents a detail view of the lower end of the changing-lever and connected parts. Fig. 10 represents a section along the line 10 10 of Fig. 9, and Fig. 11 represents a section along the line 11 11 of Fig. 10.

A, A' and $A^2$ represent parts of the bicycle-frame, which are constructed substantially in the ordinary way. The part A is provided with a lug $a$ pivoted at $a'$ to the clamp-piece or stud $a^2$, fast to the rear axle $D^0$ on which the hub D' revolves, which hub is connected by the spokes $d$ to the tire $D^2$ in the ordinary way. The opposite end of this frame-piece A terminates in a block $A^0$, which is perforated, as at $a^0$, to receive the pin $A^4$, which is mounted in the framework, as shown in Fig. 2, and permits the block $A^0$ to slide longitudinally thereon. This block $A^0$ is pressed toward the pedal-crank by the spring $a^4$, for reasons which will be hereinafter described.

The frame-piece A is inclosed in a hollow shaft B, which is mounted on ball or other antifriction bearings $b$, as shown in Fig. 2. To the rear end of this shaft a gear-wheel C is attached, which gears in the gear-wheel D attached to the hub D' of the rear wheel of the bicycle.

Near the front end of the shaft B a sliding sleeve F is mounted, which is slotted, as at $f$, to receive the lug G, which lug is fast to the shaft B, and thus the said sleeve F is held against turning on the said shaft, but is free to slide longitudinally thereon. This sleeve F carries the pinion E, which has teeth adapted to engage in the perforations in the disk or cone-wheel L, which is attached to the plate L' and the pedal-crank $L^3$, as shown in Fig. 2, and thus rotates with the crank-shaft $L^2$.

The perforations in the plate L are preferably made in concentric rings, as shown in Figs. 1 and 4, and in order to vary the gearing of the bicycle it becomes necessary to first withdraw the pinion from engagement with the cone-wheel, which is done by swinging the shaft B about the pivot $a'$, and then by sliding the pinion E out or in on the shaft B, which operations are accomplished by means of the changing-lever K, as will be hereinafter described. Having moved the pinion E the desired distance along the shaft B, the said shaft is released, and the spring $a^4$ forces the pinion E into engagement with the cone-wheel, as will be hereinafter described.

The changing-lever K is provided with two curved arms $k$ at the lower end thereof, which engage the lugs $j$ of the two half-rings J, as shown in Figs. 9, 10, and 11. These two half-rings J are held between the flanges of the set-collar H, as shown in Figs. 9 and 11, which collar is fast on the sleeve F. This changing-lever K is pivoted, as at N in Fig. 1, or as shown in detail in Figs. 5 and 6, where $A^3$ represents the two parts of the frame to which the link-piece N is attached, which link-piece is provided with an enlarged cylindrical portion near the center thereof in the form of a cup, having a bottom $n$ perforated to admit the free passage of the sleeve N', and a cap-piece $n'$ also perforated to admit the requisite amount of lateral motion to the said sleeve N', in which the lever K slides, as shown most clearly in Fig. 5. Outside of this sleeve N' are two rubber washers $N^2$, which are set down in the cup in the center of the link-piece, and are separated by a rib $n^3$ on the sleeve or tube N', as shown in Fig. 5. This arrangement provides a pivot for the lever K, which gives the said lever the required amount of lateral play and at the same time admits the longitudinal motion of the lever through the pivot-bearing. Moreover, the said bearing will not rattle, and is cheap, light, and durable.

The upper end of the lever K is provided with a resilient tongue $K^2$, terminating in a thumb-lug $k^2$. This upper end of the lever passes through the elongated slot $p^0$ of the plate P, which is fast to the cross-bar $A^2$, as shown in Figs. 1 and 8. This elongated slot is provided with a plurality of holding-recesses $p'$, $p^2$, and $p^3$, corresponding to the number of circles of perforations in the cone-wheel L, and each holding-recess having an indentation to engage the spring-tongue $K^2$ of the changing-lever K. It will be seen that the first effect of moving the changing-lever out of one of these recesses will be to move the pinion E back out of engagement with the cone-wheel L, and then when the changing-lever is eased down into the next holding-recess or any other holding-recess, the gearing of the bicycle will be changed to give either more power and less speed, or vice versa.

For "coasting" it is desirable to disconnect the pedal from the hind wheel and thus to allow the pedal-crank to remain still while the wheels are rapidly revolving. For this purpose I provide a holding-notch $p^0$ in the plate P, so placed that it will hold the changing-lever K in such a position that the pinion E will be out of engagement with the cone-wheel L. This arrangement, whereby the pedal-crank is prevented from revolving, does away with much of the danger incident to coasting, where the machine is not provided with suitable brakes. Thus ordinarily when coasting the pedal is revolving so rapidly that it is impossible to place the feet thereon without slowing down the machine, and it is impracticable to slow down the machine without a brake, while by this arrangement the feet may be placed on the pedal and the pinion thrown into gear with the cone-wheel, no matter how high the rate of speed of the bicycle.

It will thus be seen that I provide a ready means for increasing the power-arm of the crank or decreasing the same when desired, whereby increased power, as in going uphill, or increased speed, as in going down or running on a level, may be obtained. Moreover, I provide means whereby the machine may be kept under better control at all times.

The collar, by means of which the changing-lever is connected to the shaft B, may be provided with ball-bearings, as shown in Fig. 2, or may be mounted directly on the sleeve F, as shown in Figs. 9, 10, and 11, or any other convenient means of connecting the lower end of the changing-lever to the said sleeve F may be used, if desired.

It will be obvious that other means for pivoting the said changing-lever in the framework of the machine may be adopted, if desired. These and various other modifications of the herein-described apparatus will readily suggest themselves to any one skilled in the art, and may be used without departing from the spirit of my invention.

Having thus described my invention, what I claim, and desire to secure by Letters Patent of the United States, is—

1. In a changeable gearing for bicycles, the combination with a cone-wheel rotated by the pedal-crank, and provided with a plurality of perforations, of a pinion meshing in said perforations, and a changing-lever for moving said pinion into and out of engagement with said cone-wheel and along a radius thereof, a pivoted tube inclosing said lever, and rubber washers inclosing said tube, a pivoted shaft carrying said pinion, and driven thereby, and gearing connecting said shaft to one of the wheels of the bicycle, substantially as described.

2. In a changeable gearing for bicycles, the combination with a wheel attached to and rotated by the pedal-crank and provided on the inner side thereof with a plurality of perforations arranged in a series of circles about the axis of said wheel, the said circles being concentrically disposed, of a pinion meshing in said perforations, a changing-lever for moving said pinion out of engagement with said perforations, and for sliding the same along a radius of the cone-wheel, a pivoted tube inclosing said changing-lever, rubber washers forming a pivot for said tube, a pivoted shaft carrying said pinion and driven thereby, and gearing connecting said shaft to one of the wheels of the bicycle, substantially as described.

3. In a changeable gear for bicycles, the combination with a gear-wheel provided with a plurality of perforations, of a pinion meshing in said perforations, and means for moving said pinion along a radius of said gear-wheel, a hollow shaft driven by said pinion, gearing connecting said shaft to one of the wheels of the bicycle, a pivoted frame-piece extending through and provided with journal-bearings for said shaft, and means for swinging said frame-piece about its pivot, substantially as described.

4. In a changeable gear for bicycles, the combination of a gear-wheel provided with a plurality of perforations of a pinion meshing in said perforations, a hollow shaft driven by said pinion, gearing connecting said shaft to one of the wheels of the bicycle, a pivoted frame-piece extending through and provided with journal-bearings for said shaft, and a hand-lever, pivoted on the framework and adapted to swing about its pivot in every direction, connected to said pinion for moving the same in or out or longitudinally, substantially as described.

In testimony whereof I affix my signature in presence of two witnesses.

FRANCIS A. RICH.

Witnesses:
WILLIAM E. FISHER,
JAMES H. THOMAS.